(12) United States Patent
Palanisamy et al.

(10) Patent No.: US 10,520,940 B2
(45) Date of Patent: Dec. 31, 2019

(54) AUTONOMOUS OPERATION USING DEEP SPATIO-TEMPORAL LEARNING

(71) Applicant: GM Global Technology Operations LLC, Detroit, MI (US)

(72) Inventors: Praveen Palanisamy, Sterling Heights, MI (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 213 days.

(21) Appl. No.: 15/676,125

(22) Filed: Aug. 14, 2017

(65) Prior Publication Data
US 2019/0049963 A1  Feb. 14, 2019

(51) Int. Cl.
*G05D 1/02* (2006.01)
*G05D 1/00* (2006.01)
*G06N 3/02* (2006.01)

(52) U.S. Cl.
CPC ......... *G05D 1/0088* (2013.01); *G05D 1/0246* (2013.01); *G05D 1/0257* (2013.01); *B60W 2900/00* (2013.01); *G05D 2201/0213* (2013.01)

(58) Field of Classification Search
CPC .. G05D 1/0088; G05D 1/0246; G05D 1/0257; G05D 2201/0213; B60W 2900/00; G06N 3/02

USPC ............................................. 701/28, 27, 44
See application file for complete search history.

(56) References Cited

U.S. PATENT DOCUMENTS

| | | | |
|---|---|---|---|
| 9,286,524 B1 * | 3/2016 | Mei | G06K 9/6273 |
| 9,760,806 B1 * | 9/2017 | Ning | B60W 50/14 |
| 10,176,388 B1 * | 1/2019 | Ghafarianzadeh | G06K 9/00671 |
| 2017/0286826 A1 * | 10/2017 | Min | B60W 40/00 |
| 2018/0074493 A1 * | 3/2018 | Prokhorov | G06N 3/0454 |

OTHER PUBLICATIONS

Bojarski et al., End to End Learning for Self-Driving Cars, Apr. 25, 2016, NVIDIA Corporation (Year: 2016).*
Chen, Extracting Cognition out of Images for the Purpose of Autonomous Driving, May 2016, Princeton University Dissertation (Year: 2016).*

* cited by examiner

*Primary Examiner* — Nadeem Odeh
(74) *Attorney, Agent, or Firm* — Cantor Colburn LLP

(57) ABSTRACT

A system and method to perform autonomous operation of a vehicle include obtaining one or more image frames for a time instance t from corresponding one or more sensors. Processing the one or more image frames includes performing convolutional processing to obtain a multi-dimensional matrix $x_t$. The method includes operating on the multi-dimensional matrix $x_t$ to obtain output $h_t$. The operating includes using an output $h_{t-1}$ of the operating for a previous time instance t−1. The method also includes post-processing the output $h_t$ to obtain one or more control signals to affect operation of the vehicle.

20 Claims, 4 Drawing Sheets

AUTONOMOUS OPERATION USING DEEP SPATIO-TEMPORAL LEARNING

INTRODUCTION

The subject disclosure relates to autonomous operation using deep spatio-temporal learning.

Autonomous vehicle systems may augment or automate driving tasks such as braking, steering, parking, or even end-to-end driving. Many of these autonomous vehicle systems rely on a layered architecture that involves obtaining sensor data, fusing sensor data from different sensors, determining environmental conditions, planning, and ultimately issuing commands to carry out the planned actions. Neural networks have been used to issue commands based directly on sensor input. These neural networks are typically deep neural networks with hidden layers to process a set of images, for example. These neural networks operate on a frame-by-frame basis such that commands are issued in consideration of spatial but not temporal processing. Accordingly, it is desirable to provide autonomous operation using deep spatio-temporal learning.

SUMMARY

In one exemplary embodiment, a method of performing autonomous operation of a vehicle includes obtaining one or more image frames for a time instance t from corresponding one or more sensors, and processing the one or more image frames, the processing including performing convolutional processing to obtain a multi-dimensional matrix $x_t$. The method also includes operating on the multi-dimensional matrix $x_t$ to obtain output $h_t$, wherein the operating includes using an output $h_{t-1}$ of the operating for a previous time instance t−1, and post-processing the output $h_t$ to obtain one or more control signals to affect operation of the vehicle.

In addition to one or more of the features described herein, the processing the one or more image frames includes normalizing each of the one or more image frames prior to the performing the convolutional processing.

In addition to one or more of the features described herein, the performing the convolutional processing includes performing N successive convolutions with N kernel matrices, wherein the kernel matrices have a random value and a pre-defined size and dimension initially.

In addition to one or more of the features described herein, the operating on the multi-dimensional matrix $x_t$ using the output $h_{t-1}$ of the operating for the previous time instance t−1 includes performing computations of non-linear functions using weights.

In addition to one or more of the features described herein, the one or more control signals are compared respectively with one or more actual control signals during a training mode.

In addition to one or more of the features described herein, the weights are optimized based on the comparing.

In addition to one or more of the features described herein, the post-processing the output $h_t$ to obtain the one or more control signals includes converting the output $h_t$ to a single dimensional vector and mapping the single dimensional vector to the one or more control signals.

In addition to one or more of the features described herein, the one or more control signals are provided to a vehicle control system of the vehicle.

In addition to one or more of the features described herein, the one or more control signals are provided to an autonomous steering system of the vehicle.

In addition to one or more of the features described herein, the providing the one or more control signals includes providing one or more of a steering, throttle level, or braking signal.

In another exemplary embodiment, a system to perform autonomous operation of a vehicle includes one or more sensors to obtain one or more image frames for a time instance t. The system also includes a controller to process the one or more image frames including performing convolutional processing to obtain a multi-dimensional matrix $x_t$, to operate on the multi-dimensional matrix $x_t$ to obtain output $h_t$. An output $h_{t-1}$ of the operating is used for a previous time instance t−1, and the output $h_t$ is post-processed to obtain one or more control signals to affect operation of the vehicle.

In addition to one or more of the features described herein, the controller is processes the one or more image frames by normalizing each of the one or more image frames prior to the performing the convolutional processing.

In addition to one or more of the features described herein, the controller performing the convolutional processing includes performing N successive convolutions with N kernel matrices. The kernel matrices have a random value and a fixed size and dimension initially.

In addition to one or more of the features described herein, the controller operates on the multi-dimensional matrix $x_t$ using the output $h_{t-1}$ of the operating for the previous time instance t−1 by performing computations of non-linear functions using weights.

In addition to one or more of the features described herein, the controller compares the one or more control signals respectively with one or more actual control signals during a training mode.

In addition to one or more of the features described herein, the controller optimizes the weights based on the comparing.

In addition to one or more of the features described herein, the controller post-processes the output $h_t$ to obtain the one or more control signals by converting the output $h_t$ to a single dimensional vector and mapping the single dimensional vector to the one or more control signals.

In addition to one or more of the features described herein, the controller provides the one or more control signals to a vehicle control system of the vehicle.

In addition to one or more of the features described herein, the vehicle control system is an autonomous steering system of the vehicle.

In addition to one or more of the features described herein, the one or more control signals is one or more of a steering, throttle level, or braking signal.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

As previously noted, neural networks may receive sensor inputs and provide commands to control aspects of autonomous driving. In autonomous driving systems, for example, brake, throttle level, steering, or transmission or any combination of these may be controlled based on control signals generated by the neural network. When neural network processing is done on a frame-by-frame basis, the resulting autonomous driving commands can create a rough ride rather than smooth operation. Embodiments of the systems and methods detailed herein relate to a neural network to translate image pixels to control signals. The architecture of the neural network implements deep spatio-temporal learning based on a memory element that facilitates feedback from previous frames. This consideration of temporal as well as spatial input in generating the autonomous driving command at each time instance results in the set of issued commands that facilitate a smoother transition of the system being controlled. While steering control is specifically discussed for explanatory purposes, the one or embodiments of the architecture detailed herein may be applied to other autonomous driving systems such as throttle, transmission, and brake control, as well.

Figure 1:
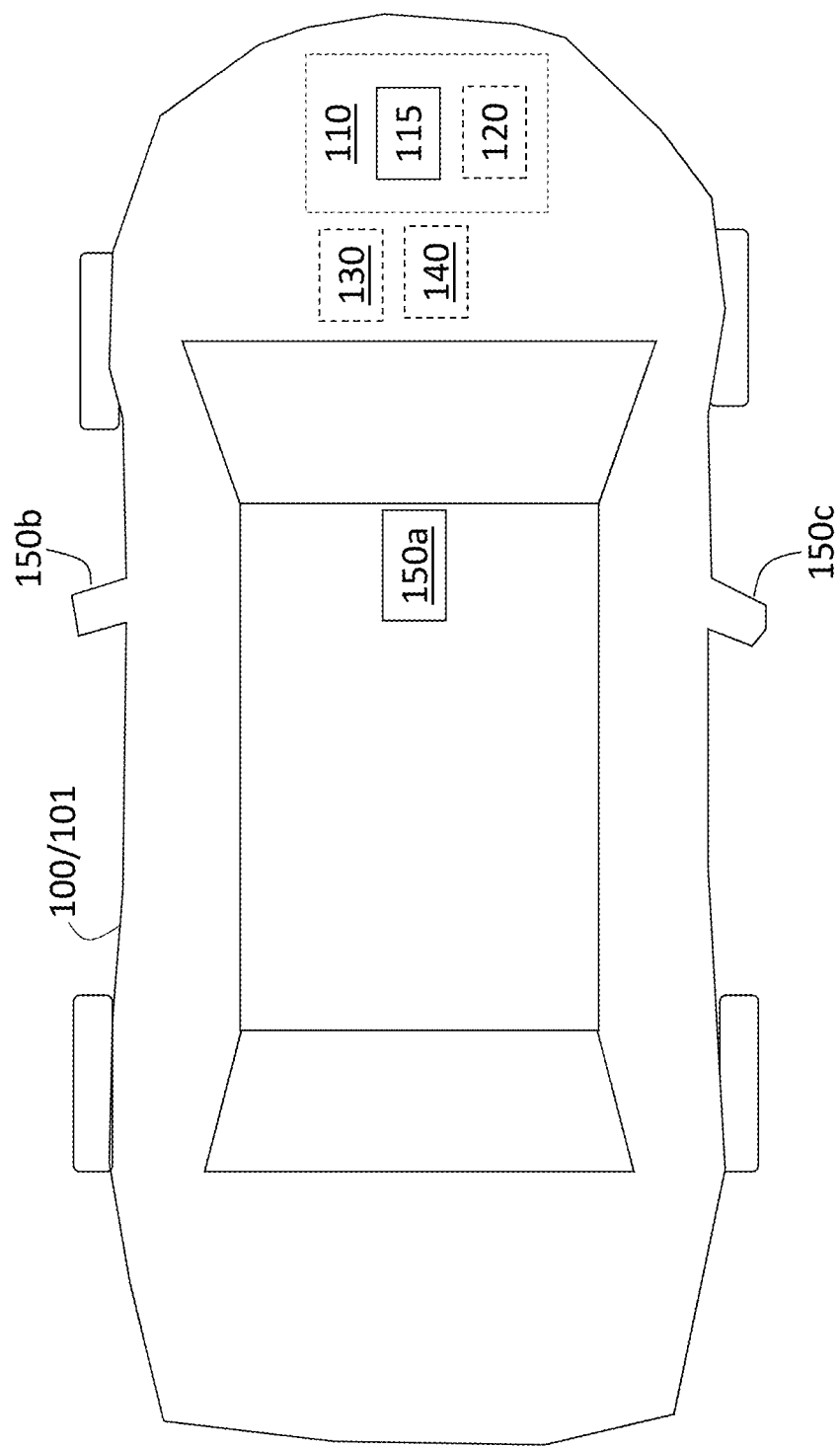
FIG. 1 is a block diagram of an autonomous vehicle system with autonomous-driving architecture using deep spatio-temporal learning according to one or more embodiments.

In accordance with an exemplary embodiment, FIG. 1 is a block diagram of an autonomous vehicle system with autonomous driving architecture using deep spatio-temporal learning. The vehicle 100 shown in FIG. 1 is an automobile 101. A controller 110 provides autonomous operation commands (based on control signals 290, FIG. 2) to a steering system 130 or other vehicle systems 140. The controller 110 uses images obtained by one or more sensors 150a, 150b, 150c (generally referred to as 150) to determine the commands. The sensor 150 may be, for example, a still or video camera, imaging radar, or a light detection and ranging (lidar) system that obtains a point cloud as an image. One image frame is obtained by each sensor 150 at each instance of time for two or more instances of time. While FIG. 1 shows three sensors 150 in the exemplary embodiment, any number of sensors 150 at different locations of the vehicle 100 may be used. The steering system 130 and other vehicle systems 140 represent the various components that relate to controlling the specified system. For example, as previously noted, the autonomous operation commands provided by the controller 110 may include control signals 290 (FIG. 2) that enable controlling braking, transmission, and throttle level in addition to controlling the steering itself. All those components that make up steering control are represented by the steering system 130 shown in FIG. 1.

The controller 110 includes the neural network architecture according to one or more embodiments. The controller 110 includes processing circuitry that may include an application specific integrated circuit (ASIC), an electronic circuit, a processor 115 (shared, dedicated, or group) and memory 120 that executes one or more software or firmware programs as shown in FIG. 1, a combinational logic circuit, and/or other suitable components that provide the described functionality. The neural network architecture implemented by the controller 110 is outlined with reference to FIG. 2.

Figure 2:
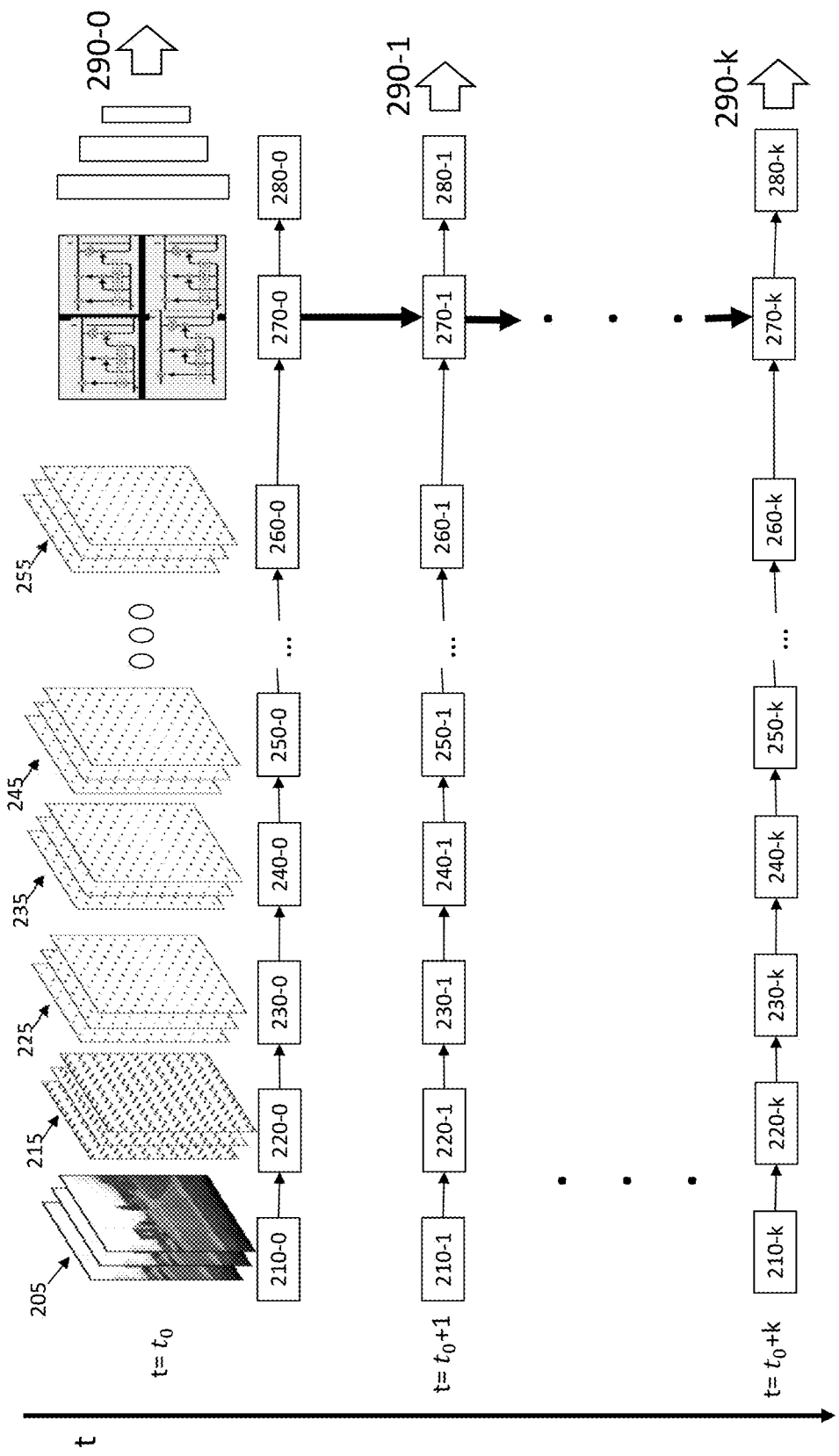
FIG. 2 is a block flow diagram of the neural network architecture according to one or more embodiments.

FIG. 2 is a block flow diagram of the neural network architecture implemented by the controller 110 according to one or more embodiments. As noted with reference to FIG. 1, the neural network architecture detailed in FIG. 2 is part of the controller 110 that facilitates an autonomous vehicle system with autonomous-steering architecture using deep recurrent learning according to the exemplary case discussed for explanatory purposes. The processing blocks are shown for three time instances (t0, t0+1, t0+k) out of k+1 time instances for which the processing is performed. At each time instance, image frames 205 (one image frame 205 from each sensor 150) are obtained at block 210. At block 220, the image frames 205 obtained at block 210 are normalized. This known process involves normalizing or mapping the intensity (e.g., 0-255 gray scale intensity range) of the matrix of pixels associated with each image frame to a normalized value (e.g., 0-1) in order to generate a normalized pixel matrix 215 for each image frame.

At block 230, a convolution process is performed of the normalized pixel matrix 215 with a kernel matrix (kernel1). The result of the convolution conv1 225 is an input to the convolution at block 240. A convolution of the conv1 225 matrix resulting from the convolution at block 230 with another kernel matrix (kernel2) results in conv2 235. This in turn is the input to another convolution at block 250. A convolution of the conv2 235 matrix resulting from the convolution at block 240 with another kernel matrix (kernel3) results in conv3 245.

In this manner, the convolution at block 260 is the $N^{th}$ convolution using kernel matrix (kernel) and results in convN 255 (referred to as input $x_t$). The value of N (i.e., the number of convolution processes) is one or more and, once determined, is the same for the processing of image frames 205 at each time instance. The size, dimension, and values of each of the kernel matrices (kernel1 through kernelN) are customizable. Initially, the values of each of the kernel matrices are random while the size and dimension are fixed (pre-defined). The fixed size and dimension may be determined using a known pyramidal approach such as Gaussian pyramids, for example. The result of each convolutional process (conv1 225 through convN 255) is a multi-dimensional matrix that is an L×L matrix (e.g., 256-by-256). Thus, $x_t$ is an L×L matrix.

The N convolutional processes represent the spatial dimension of the neural network processing. The multiple time instances ($t_0$, $t_0+1$, . . . , $t_0+k$) represent the temporal dimension of the neural network processing. A memory unit (MU) 270 processes the output ($x_t$) of the last (Nth) convolutional process and the result ($h_{t-1}$) from the MU 270 at a previous time step (except for t=$t_0$) at block 260 as detailed at FIG. 3. The use of the result from the previous time step represents the recurrent (temporal) aspect of the learning. At a given time t, historical data for every previous time step beginning with t=$t_0$ is encoded in $h_{t-1}$. An exemplary MU 270 is a gated recurrent unit (GRU). At block 280, the output $h_t$ of the MU 270 undergoes known flattening and mapping processes to generate the control signal 290. Flattening refers to converting the multi-dimensional matrix $h_t$ that is output by the MU 270 into a single dimensional vector. Mapping includes a non-linear mapping function to convert the single dimensional vector resulting from the flattening to the control signal 290 that is ultimately provided to a vehicle system 140.

Figure 3:
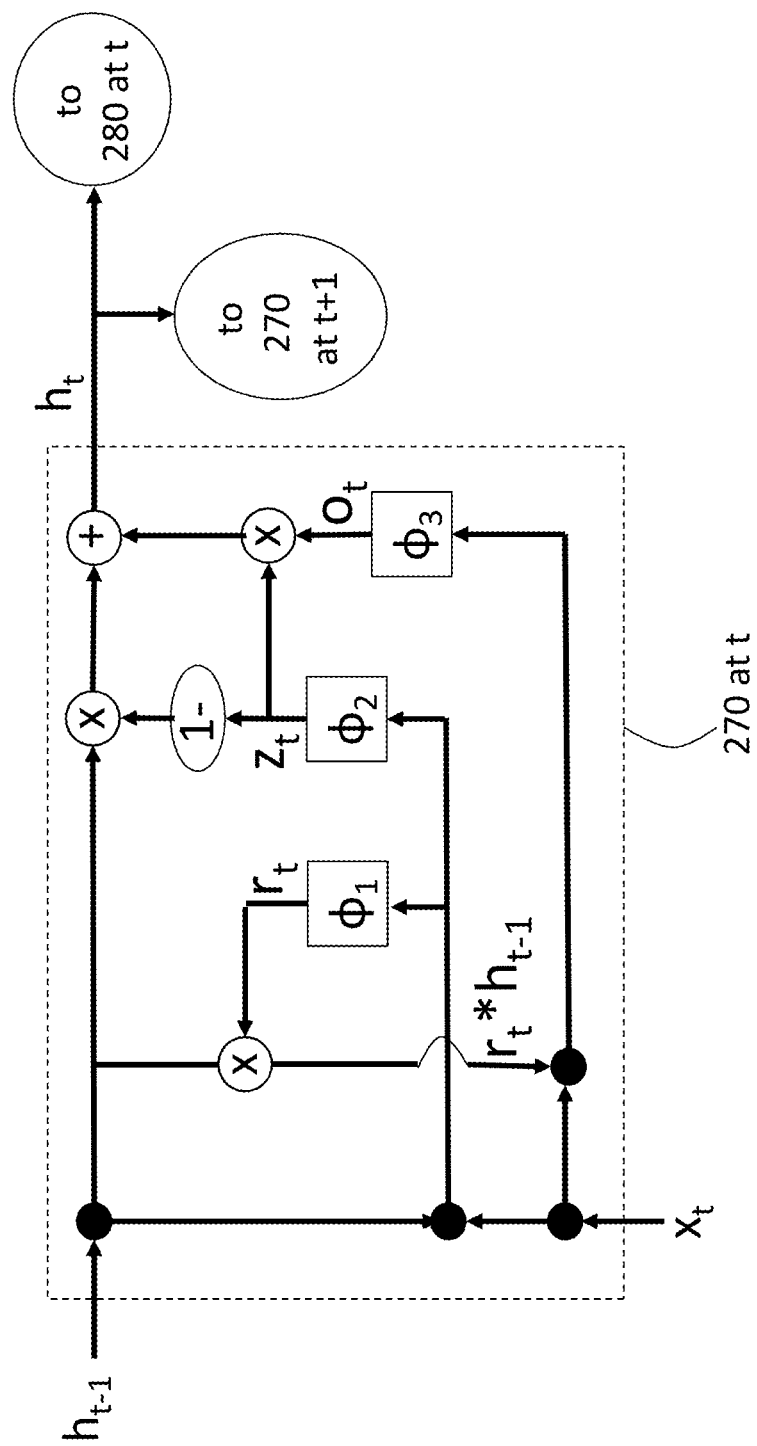
FIG. 3 is a block diagram of functionality of the gated spatio-temporal unit that is part of the neural network architecture according to one or more embodiments.

FIG. 3 is a block diagram of functionality of the MU 270 that is part of the neural network architecture according to one or more embodiments. Each MU 270 functions as a neuron of the neural network. At a given time instant, t, the MU 270 receives the output ($x_t$) of the last (Nth) convolutional process. When the time step t is any time step other than the first time step (i.e., when t≠$t_0$), the MU 270 also receives the output or MU 270 result ($h_{t-1}$) from the previous time step. When multiple control signals 290 are provided, a single MU 270 may be used at each time step, as shown for the exemplary embodiment of FIG. 2, with the mapping (at block 280) outputting multiple control signals 290 (e.g., steering, throttle level, braking, transmission) from the single dimensional vector rather than a single control signal 290. According to alternate embodiments, a separate MU 270 may generate each control signal 290.

The operations performed within the MU 270 include the computation of $r_t$, $z_t$ and $o_t$, as indicated below.

$$z_t = \phi_1(W_z \cdot [h_{t-1}, x_t])  \quad [\text{EQ. 1}]$$

$$r_t = \phi_2(W_r \cdot [h_{t-1}, x_t])  \quad [\text{EQ. 2}]$$

$$o_t = \phi_3(W_o \cdot [r_t * h_{t-1}, x_t])  \quad [\text{EQ. 3}]$$

In EQS. 1-3, $W_z$, $W_r$, and $W_o$ are weights that are determined at each time step as detailed with reference to FIG. 4. The symbol $\phi$ represents a non-linear function, and $\phi 1$, $\phi 2$, and $\phi 3$ may be one of the following exemplary non-linear functions:

$$\phi(v) = \tan h(v) \quad [\text{EQ. 4}]$$

In EQ. 4, tan h is the hyperbolic tangent, and v refers to whatever value the function $\phi$ acts on.

$$\phi(v) = \frac{1}{(1+e^{-v})} \quad [\text{EQ. 5}]$$

$$\phi(v) = e^{\frac{\|v-c\|^p}{2\sigma^p}} \quad [\text{EQ. 6}]$$

In EQ. 6, c is a constant, σ is a variance, and p is a power (e.g., p=2). The constant c, variance σ, and power p are tunable parameters that may be determined through experimentation. Using the computations shown in EQS. 1-3, the output of the MU 270 ($h_t$) is computed as:

$$h_t = (1-z_t) * h_{t-1} + z_t * o_t \quad [\text{EQ. 7}]$$

At indicated in FIG. 3, the output $h_t$ of the MU 270 is provided for flattening and mapping, at block 280, and is also provided to the MU 270 for the next time instance. This use of the MU 270 output $h_t$ in the subsequent time instance represents the temporal aspect of the autonomous-operation architecture according to the one or more embodiments.

Figure 4:
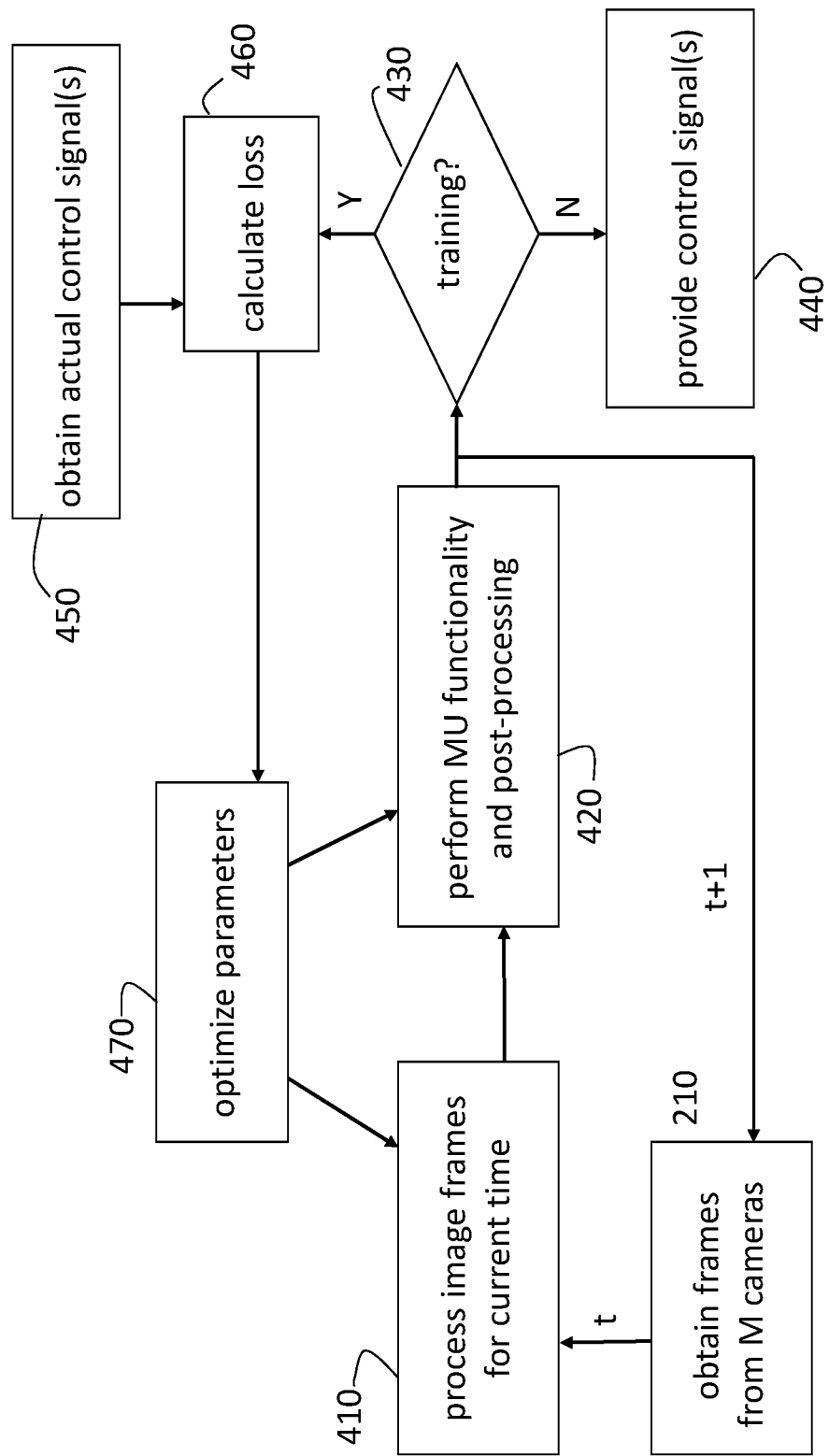
FIG. 4 is a process flow of training and using the neural network architecture according to one or more embodiments.

FIG. 4 is a process flow of training and using the neural network architecture according to one or more embodiments. As discussed with reference to FIG. 2, obtaining image frames 205, at block 210, includes obtaining image frames 205 from M sensors 150 arranged at different locations of the vehicle 100 at a time instance t. The number of sensors 150, M, is one or more. At block 410, processing the M image frames 205 includes performing the normalizing shown at block 220 and the N convolution processes shown at blocks 220 through 260 in FIG. 2. Performing the MU 270 functionality and post-processing, at block 420, includes performing the functionality discussed with reference to FIG. 3 (at block 270) to obtain the output $h_t$ and also performing the flattening and mapping (at block 280) to obtain one or more control signals 290. At block 430, a check is performed of whether the one or more control signals 290 generated at block 420 are generated in a training mode. If the one or more control signals 290 are not generated for training, then providing the one or more control signals 290, at block 440, refers to providing them to the vehicle systems 140 to control operation of the vehicle 100.

At block 450, obtaining actual control signals refers to operating the vehicle 100 or simulating operation of the vehicle 100 to obtain the same type of control signals (e.g., steering, throttle level, braking, transmission) that are generated by the controller 110 that includes the neural network architecture according to the one or more embodiments detailed herein. If the one or more control signals 290 are generated for training (according to the check at block 430), then calculating a loss, at block 460, refers to comparing the one or more control signals 290 generated by the controller 110 with the same control signals obtained at block 450.

Optimizing parameters, at block 470, is based on the calculation at block 460. This optimizing includes modifying the values of kernel1 through kernelN, which are used in the N convolution processes. The optimizing also includes modifying the weights $W_z$, $W_r$, and $W_o$ as needed. The optimizing affects the convolution processes or MU 270 or both in the next time instance (t+1). The initial values of weights $W_z$, $W_r$, and $W_o$ may be determined in a number of known ways. For example, the values may be initialized as constants. They may, instead, be sampled from a Gaussian distribution, uniform distribution, or normal distribution or initialized as an orthogonal matrix or sparse matrix.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of performing autonomous operation of a vehicle, the method comprising:
   obtaining one or more image frames for a time instance t from corresponding one or more sensors;
   processing the one or more image frames, the processing including performing convolutional processing to obtain a multi-dimensional matrix $x_t$;
   operating on the multi-dimensional matrix $x_t$ to obtain output $h_t$, wherein the operating includes using an output $h_{t-1}$ of the operating for a previous time instance t−1; and
   post-processing the output $h_t$ to obtain one or more control signals to affect operation of the vehicle.

2. The method according to claim 1, wherein the processing the one or more image frames includes normalizing each of the one or more image frames prior to the performing the convolutional processing.

3. The method according to claim 1, wherein the performing the convolutional processing includes performing N successive convolutions with N kernel matrices, wherein the kernel matrices have a random value and a pre-defined size and dimension initially.

4. The method according to claim 1, wherein the operating on the multi-dimensional matrix $x_t$ using the output $h_{t-t}$ of the operating for the previous time instance t−1 includes performing computations of non-linear functions using weights.

5. The method according to claim 4, further comprising comparing the one or more control signals respectively with one or more actual control signals during a training mode.

6. The method according to claim 5, further comprising optimizing the weights based on the comparing.

7. The method according to claim 1, wherein the post-processing the output $h_t$ to obtain the one or more control signals includes converting the output $h_t$ to a single dimensional vector and converting the single dimensional vector to the one or more control signals.

8. The method according to claim 1, further comprising providing the one or more control signals to a vehicle control system of the vehicle.

9. The method according to claim 8, further comprising providing the one or more control signals to an autonomous steering system of the vehicle.

10. The method according to claim 1, wherein the one or more control signals includes one or more of a steering control signal, throttle level control signal, transmission control signal, or braking signal control signal.

11. A system to perform autonomous operation of a vehicle, the system comprising:
one or more sensors configured to obtain one or more image frames for a time instance t;
a controller configured to process the one or more image frames including performing convolutional processing to obtain a multi-dimensional matrix $x_t$, to operate on the multi-dimensional matrix $x_t$ to obtain output $h_t$, wherein operating includes using an output $h_{t-1}$ of the operating for a previous time instance t−1, and to post-process the output $h_t$ to obtain one or more control signals to affect operation of the vehicle.

12. The system according to claim 11, wherein the controller is further configured to process the one or more image frames by normalizing each of the one or more image frames prior to the performing the convolutional processing.

13. The system according to claim 11, wherein the controller performing the convolutional processing includes performing N successive convolutions with N kernel matrices, wherein the kernel matrices have a random value and a fixed size and dimension initially.

14. The system according to claim 11, wherein the controller is further configured to operate on the multi-dimensional matrix $x_t$ using the output $h_{t-1}$ of the operating for the previous time instance t−1 by performing computations of non-linear functions using weights.

15. The system according to claim 14, wherein the controller is further configured to compare the one or more control signals respectively with one or more actual control signals during a training mode.

16. The system according to claim 15, wherein the controller is further configured to optimize the weights based on the comparing.

17. The system according to claim 11, wherein the controller is further configured to post-process the output $h_t$ to obtain the one or more control signals by converting the output $h_t$ to a single dimensional vector and converting the single dimensional vector to the one or more control signals.

18. The system according to claim 11, wherein the controller is further configured to provide the one or more control signals to a vehicle control system of the vehicle.

19. The system according to claim 18, wherein the vehicle control system is an autonomous steering system of the vehicle.

20. The system according to claim 11, wherein the one or more control signals is one or more of a steering control signal, throttle level control signal, braking control signal, or transmission control signal.

* * * * *